(12) United States Patent
Bertolotti et al.

(10) Patent No.: US 11,390,014 B2
(45) Date of Patent: Jul. 19, 2022

(54) DEVICE FOR COMPACTING A TUBULAR STRUCTURE, ASSOCIATED INSTALLATION AND METHOD

(71) Applicant: TECHNIP N-POWER, Courbevoie (FR)

(72) Inventors: Philippe Bertolotti, Suresnes (FR); Anh Tuan Do, Cormeilles en Parisis (FR); Michel Niquet, Bernac-Dessus (FR); Jean-Pierre Soulier, Gayan (FR)

(73) Assignee: TECHNIP N-POWER

( * ) Notice: Subject to any disclaimer, the term of this patent is extended or adjusted under 35 U.S.C. 154(b) by 0 days.

(21) Appl. No.: 16/981,967

(22) PCT Filed: Mar. 19, 2019

(86) PCT No.: PCT/EP2019/056893
§ 371 (c)(1),
(2) Date: Sep. 17, 2020

(87) PCT Pub. No.: WO2019/180050
PCT Pub. Date: Sep. 26, 2019

(65) Prior Publication Data
US 2021/0114283 A1    Apr. 22, 2021

(30) Foreign Application Priority Data
Mar. 20, 2018  (FR) ..................... 1852376

(51) Int. Cl.
*B29C 53/56*   (2006.01)
*B29C 53/62*   (2006.01)
*B29C 53/80*   (2006.01)

(52) U.S. Cl.
CPC ............ *B29C 53/566* (2013.01); *B29C 53/62* (2013.01); *B29C 53/8016* (2013.01)

(58) Field of Classification Search
CPC ..... B29C 53/566; B29C 53/58; B29C 53/581; B29C 53/582; B29C 53/80
(Continued)

(56) References Cited

U.S. PATENT DOCUMENTS

| | | | |
|---|---|---|---|
| 4,479,835 A | 10/1984 | Kutnyak et al. | ............... 156/143 |
| 4,867,834 A | 9/1989 | Alenskis | |

(Continued)

FOREIGN PATENT DOCUMENTS

| | | |
|---|---|---|
| CA | 1069812 A | 1/1980 |
| CN | 2878876 Y | 3/2007 |

(Continued)

OTHER PUBLICATIONS

International Search Report dated May 21, 2019 in corresponding PCT International Application No. PCT/EP2019/056893.

(Continued)

*Primary Examiner* — Carson Gross
(74) *Attorney, Agent, or Firm* — Ostrolenk Faber LLP

(57) ABSTRACT

A compacter that includes a compacting roller assembly, borne by a support element. The roller assembly includes a straight central shaft, having a longitudinal axis, and a plurality of compacting rollers, mounted parallel to one another about the central shaft, each compacting roller having a peripheral surface rotating around the central shaft about a roller axis. The longitudinal axis of the central shaft is parallel to the central axis of the support element. Each roller axis is inclined by a nonzero incline angle relative to the longitudinal axis of the central shaft.

15 Claims, 9 Drawing Sheets

(58) Field of Classification Search
USPC .................................................. 492/39, 40
See application file for complete search history.

(56) References Cited

U.S. PATENT DOCUMENTS

| 4,946,528 | A | * | 8/1990 | Takahashi | B29C 65/106 |
| | | | | | 156/187 |
| 5,045,147 | A | | 9/1991 | Benson | |
| 5,798,019 | A | * | 8/1998 | Cushner | G03F 7/18 |
| | | | | | 156/187 |
| 2014/0083620 | A1 | | 3/2014 | Caffiau | |
| 2018/0093433 | A1 | | 4/2018 | Treiber | |

FOREIGN PATENT DOCUMENTS

| CN | 101977705 A | 2/2011 |
| CN | 102514203 A | 6/2012 |
| CN | 205024506 U | 2/2016 |
| CN | 105459384 A | 4/2016 |
| CN | 105538678 A | 5/2016 |
| CN | 106104127 A | 11/2016 |
| CN | 206644328 U | 11/2017 |
| EP | 0887177 A2 | 12/1998 |
| EP | 1132193 A1 | 9/2001 |
| EP | 1 090 243 | 8/2002 |
| EP | 1958758 A1 | 8/2008 |
| EP | 2145755 A1 | 1/2010 |
| GB | 2 212 590 A | 7/1989 |
| GB | 2526986 A | 12/2015 |
| JP | 2015-136897 A | 7/2015 |
| WO | WO 00/70256 A1 | 11/2000 |
| WO | WO 2006/107196 A1 | 10/2006 |
| WO | WO 2008/029252 A1 | 3/2008 |
| WO | WO 2012/118378 A1 | 9/2012 |
| WO | WO 2012/160269 A1 | 11/2012 |
| WO | WO 2014/023943 A1 | 2/2014 |

OTHER PUBLICATIONS

Written Opinion dated May 21, 2019 in corresponding PCT International Application No. PCT/EP2019/056893.
Search Report dated Nov. 7, 2018 in corresponding French Patent Application No. 1852376.
N. Dodds et al., "Unbonded Flexible Pipe: Composite Reinforcement for Optimized Hybrid Design," published under reference OTC-25753-MS, during the Offshore Technology Conference, Houston, May 4-7, 2015, 12 pages.
Zhang, et al. "Design of a Composite Tape Winding Machine with Full Binding Type Reinforced Thermoplastic Plastic Pipe" and "Research on Bending Structure of Sheet Metal based on Mechanical Model" (2016) China Academic Journal Electronic Publishing House http://www.cnki.net. English Abstract on p. 3.
Qiao, Jun-ping "Three Layer PE Antisepsis Technology for Steel Pipes to Model Foam Jacket Heat Preservation Pipes" (2007) China Academic Journal Electronic Publishing House http://www.cnki.net, English Abstract on p. 1.

* cited by examiner

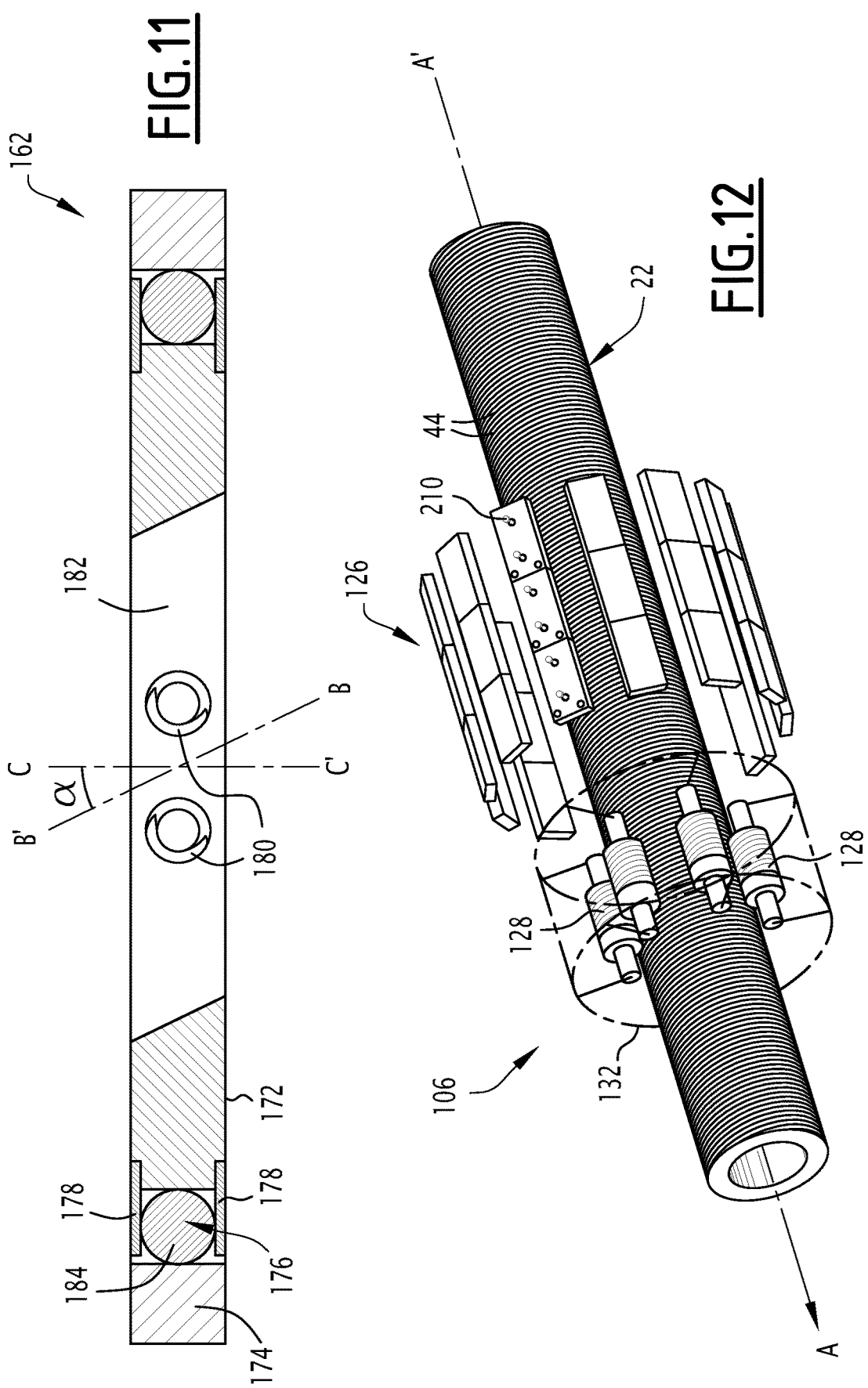

US 11,390,014 B2

DEVICE FOR COMPACTING A TUBULAR STRUCTURE, ASSOCIATED INSTALLATION AND METHOD

CROSS-REFERENCE TO RELATED APPLICATIONS

The present application is a 35 U.S.C. §§ 371 national phase conversion of PCT/EP2019/056893, filed Mar. 19, 2019, which claims priority to French Patent Application No. 1852376, filed Mar. 20, 2018, the contents of which are incorporated herein by reference. The PCT International Application was published in the French language.

FIELD OF THE INVENTION

The present invention relates to a device for compacting a tubular structure, including:
- a support element defining a circulation passage of a cylindrical surface intended to receive the tubular structure, the circulation passage having a central axis intended to be coaxial with the cylindrical surface, the support element and the cylindrical surface being intended to be mounted rotating relative to one another about the central axis;
- at least one compacting roller assembly, borne by the support element, the roller assembly including:
- a straight central shaft, having a longitudinal axis;
- a plurality of compacting rollers, mounted parallel to one another about the central shaft, each compacting roller having a peripheral surface rotating around the central shaft about a roller axis.

The tubular structure is for example a layer of a composite material of a flexible pipe for transporting fluid through a body of water.

BACKGROUND OF THE INVENTION

Flexible pipes of the aforementioned type are in particular used in deep water in the oil and gas industry. They generally extend through a body of water between a surface assembly and a bottom assembly. These pipes can also extend between two surface assemblies.

The bottom assembly is intended to collect the fluid mined in the bottom of the body of water. The surface assembly is generally floating. It is intended to collect and distribute the fluid. The surface assembly may be a semi-submersible platform, an FPSO or another floating assembly.

In some cases, for the exploitation of fluids in deep water, the flexible pipe has a length exceeding 800 m, or even greater than 1000 m or 2000 m for applications in ultradeep water.

For great depths, the flexible pipe is sized to withstand a very high hydrostatic pressure, for example 200 bars for a pipe submerged at a depth of 2000 m.

Furthermore, the flexible pipe is generally sized to withstand an axial tension greater than the total weight of the flexible pipe suspended from a surface assembly and extending underwater from the surface to the seabed. This is in particular the case when the flexible pipe is used as a riser intended to provide, in use, a vertical connection between the seabed and the surface assembly. The capacity of the flexible pipe to withstand its own weight when it is suspended in the water in particular makes it possible to facilitate its installation in the sea from a placement vessel.

Subsequently, for great depths, it is advantageous to use flexible pipes that are both very lightweight and very pressure-resistant.

Most of the flexible pipes used in the offshore oil industry are flexible pipes of the unbonded type including at least one sealing sheath reinforced by at least one reinforcing layer made up of metal wires wound in a helix around the sealing liner. Such pipes are in particular described in normative document API 17J, "Specification for Unbonded Flexible Pipe", 4th edition, May 2014 published by the American Petroleum Institute. However, these flexible pipes generally have a high weight, which makes their installation at sea complex and expensive. Furthermore, risers of this type must generally be equipped with buoys for applications at great depths, which incurs additional expenses. Lastly, the metal reinforcing layers are generally sensitive to corrosion, in particular to corrosion under the influence of acidic gases such as $H_2S$ and $CO_2$ present in the hydrocarbons of certain deposits. To address these issues, lightened flexible pipes are known including a tubular reinforcing structure made from a composite metal comprising a matrix and reinforcing fibers embedded in the matrix.

Pipes are in particular known in which the tubular reinforcing structure is made from a composite material with a thermoplastic matrix, for example a composite material including a PEEK (polyether ether ketone) matrix reinforced by carbon fibers. Such pipes are known as "Thermoplastic Composite Pipe" (TCP) and are in particular described in normative document DNVGL-RP-F119, "Recommended Practice—Thermoplastic composite pipes", published in December 2015 by the DNV GL (Det Norske Veritas GL).

TCP flexible pipes generally include, from the inside toward the outside, a tubular inner polymer liner, a tubular reinforcing structure made from composite material and an outer polymer liner. The tubular reinforcing structure theoretically being tight, the inner tubular liner is optional. However, in practice, most of these flexible pipes include an inner tubular liner so as to guarantee the tightness of the pipe in the event the tubular reinforcing structure has a manufacturing defect affecting its tightness.

The tubular reinforcing structure is advantageously glued or welded to the inner tubular liner so as to avoid the collapse of the inner tubular liner during a rapid decompression of the pipe transporting hydrocarbons in gaseous phase. The outer liner is optional. Such TCP pipes are in particular marketed by the companies Magma Global Ltd (TCP by registered trademark m-Pipe®) and Airborne Oil & Gas B.V. They are in particular described in GB2526986A, WO2014/023943, WO2012/118378, WO2006/107196 and EP1090243B1.

Flexible pipes are also known that are similar to the TCP flexible pipes in which the tubular reinforcing structure is made from a composite material with a thermosetting matrix, for example a composite including a matrix made from epoxy resin reinforced by glass fibers. These pipes generally have less flexibility than that of the TCP pipes.

So-called hybrid flexible pipes are also known that have a structure midway between that of the TCP pipes and that of the unbonded flexible pipes. These pipes include, from the inside toward the outside, an inner tubular liner, a tubular reinforcing structure made from a composite material, at least one tensile armor ply and an outer liner. The tubular reinforcing structure is advantageously made of a composite material with a thermoplastic matrix, but it is also possible to use a thermosetting matrix. The tubular reinforcing structure is advantageously welded or glued to the inner tubular liner. The tensile armor ply(s) are similar to that of the unbonded flexible pipes, that is to say they are made up of helically wound wires. Furthermore, optionally, these pipes can include an inner carcass located inside the inner sealing liner, said inner carcass serving to increase the collapse resistance of the pipe. The inner carcass is for example formed by a profiled metal sheet, wound in a spiral. The turns of the sheet are advantageously stapled to one another, which makes it possible to react the collapse forces.

These hybrid flexible pipes are in particular described in WO00/70256 and in the article "Unbonded Flexible Pipe: Composite Reinforcement for Optimized Hybrid Design" written by N. Dodds, V. Jha, J. Latto and D. Finch, and published under reference OTC-25753 during the conference "Offshore Technology Conference" that was held in Houston from May 4 to 7, 2015.

The tubular reinforcing structure comprises a tube made from composite material and has both the function of a pressure vault arranged outside an inner tubular liner and a carcass arranged inside the tubular inner sheath, that is to say that it generally reacts most of the radial forces applied to the pipe.

To manufacture the tubular structure, it is known to wind and heat strips of composite materials around a cylindrical surface that can be a mandrel, a tubular liner, or a composite tubular structure formed beforehand.

The strips are generally formed by thin tapes much longer than they are wide.

To ensure a satisfactory production of the tubular structure, in particular so that this structure has a satisfactory mechanical strength, a sufficient crystallinity level, and a minimal porosity, it is necessary to apply pressure on the strips, so as to obtain a good adhesion of the strips to the substrate, and to bond the strips to one another.

To that end, it is known to apply roller assemblies on the tubular structure that has just been wound so as to ensure the application of pressure. WO2012/160269 describes an example of a compacting device comprising a roller assembly that can be used to provide pressure on the structure.

These rollers are mounted on a fixed linear shaft and are movable between a centered idle position, and an off-centered position, to fit the shape of the part on which the roller assembly is applied.

Such a compacting device is not fully satisfactory. Indeed, in the case of a tubular structure as described above, the strips forming the tubular structure are wound in a helix about a central axis. The tubular structure moves continuously relative to the rollers, parallel to their axis of rotation.

When cylindrical rollers with an axis parallel to the central axis are applied on the successive turns of the strips that move along the central axis, a shift occurs which is capable of moving the reinforcing fibers of the strips laterally.

One potential solution is to tilt the axis of the shaft of the roller assembly relative to the central axis as suggested by WO2006/107196. In this case, the bearing no longer occurs along a generatrix of the roller assembly, but only on certain rollers at the center of the assembly. It is therefore no longer uniform, and the mechanical properties of the structure are inhomogeneous.

In theory, a roller assembly in the form of a diabolo, and/or made from rollers made from a flexible material, could improve the situation, but these configurations also produce shifting, do not adapt to the evolution of the diameter, or are incompatible with the high temperatures necessary for the softening of the strips.

One aim of the invention is therefore to obtain a compacting device that makes it possible to effectively and productively produce a mechanically strong and very tight tubular structure, from strips wound in a helix.

SUMMARY OF THE INVENTION

To that end, the invention relates to a device of the aforementioned type, characterized in that the longitudinal axis of the central shaft is parallel to the central axis, each roller axis being inclined by a nonzero incline angle relative to the longitudinal axis of the central shaft.

The device according to the invention may include one or more of the following features, considered alone or according to any technically possible combination(s):
  the support element is mounted rotating about the central axis, the cylindrical surface being able to be translated along the central axis;
  the support element is fixed in rotation about the central axis, the cylindrical surface being able to be rotated about the central axis, the support element being able to be translated along the central axis;
  the incline angle is less than 40° and is in particular between 10° and 30°;
  the rollers define at least one pseudo-linear compacting generatrix intended to come into contact with the tubular structure;
  the compacting generatrix includes a plurality of micro-bosses, the amplitude of the micro-bosses being less than 0.1 mm;
  the width of each roller is less than 10 mm;
  wherein the diameter of each roller is greater than 50 mm;
  the roller assembly includes two inclined axial endpieces, mounted fixed in rotation on the central shaft on either side of the rollers;
  each roller is mounted transversely perpendicular to the roller axis, between a central idle position and a plurality of off-centered positions, the roller including a mechanism for resilient biasing toward the idle position;
  each roller comprises an inner ring, mounted fixed in rotation about the central shaft, an outer ring, mounted rotatably about the inner ring, and at least one rolling bearing inserted between the inner ring and the outer ring;
  the inner ring includes a through hole receiving the central shaft, the through hole having an inclined axis relative to the roller axis;
  the central shaft has a central opening for circulation of a heat transfer fluid intended to cool the rollers.

The invention also relates to an installation for manufacturing a tubular structure, including:
  a station for forming the tubular structure including at least one apparatus for winding parallel strips in a helix around a cylindrical surface according to a helix angle and at least one apparatus for heating the strips;
  at least one compacting device as defined above, arranged in the station for forming the tubular structure, upstream of the station for forming the tubular structure and/or downstream of the station for forming the tubular structure, the roller assembly being intended to be applied on the cylindrical surface and/or on the tubular structure formed on the cylindrical surface.

The installation according to the invention may comprise one or more of the following features, considered alone or according to any technically possible combination(s):
  the difference between the incline angle of each roller and 90° minus the helix angle is less in absolute value than 5°, in particular less in absolute value than 3°;

the compacting device is arranged in the station for forming the tubular structure or downstream of the station for forming the tubular structure, the roller assembly being arranged to apply at least one roller on each strip of the tubular structure.

The invention also relates to a method for forming a tubular structure, comprising the following steps:
- winding parallel strips in a helix around a cylindrical surface according to a helix angle;
- before, during or after the winding in a helix, heating the strips to soften the strips at least partially;
- before, during or after the winding in a helix, compacting the cylindrical surface and/or the wound strips, respectively, via at least one compacting device as defined above.

The method according to the invention may comprise one or more of the following features, considered alone or according to any technically possible combination:
- it includes, after the compacting step:
  - winding another plurality of strips in a helix along the helix axis around strips previously wound in a helix, the strips of the other plurality of strips being wound along a helix angle opposite the strips previously wound;
  - before, during or after the winding in a helix, heating the strips to soften the strips at least partially;
  - upstream and/or downstream of the winding in a helix, compacting the cylindrical surface and/or the wound strips, respectively, via a compacting device as defined above;
- it includes winding at least one tensile armor ply not bonded to the tubular structure, around the tubular structure, the or each tensile armor ply comprising at least one armor element wound around the tubular reinforcing structure;
- it includes producing an outer liner around the tensile armor ply;
- the compacting generatrix includes a plurality of micro-bosses, the amplitude of the micro-bosses being less than three times the thickness of the strip, preferably less than five times the thickness of the strip.

BRIEF DESCRIPTION OF THE DRAWINGS

The invention will be better understood upon reading the following description, provided solely as an example, and in reference to the appended drawings, in which:

FIG. 11 is a cross-sectional view along the median axial plane of FIG. 9;

FIG. 12 is a simplified exploded perspective schematic view of a post-compacting station comprising another compacting device according to the invention;

DETAILED DESCRIPTION OF THE INVENTION

Hereinafter, the terms "outer" and "inner" respectively refer to radially further from the axis of the flexible pipe and radially closer to the axis of the flexible pipe.

The terms "front" and "rear" are to be understood axially relative to an axis A-A' of the pipe, the term "front" being understood as being relatively further from the middle of the pipe and closer to one of its ends, the term "rear" being understood as being relatively closer to the middle of the pipe and further from one of its ends. The middle of the pipe is the point of the pipe situated at equal distances from the two ends thereof.

Figure 1:
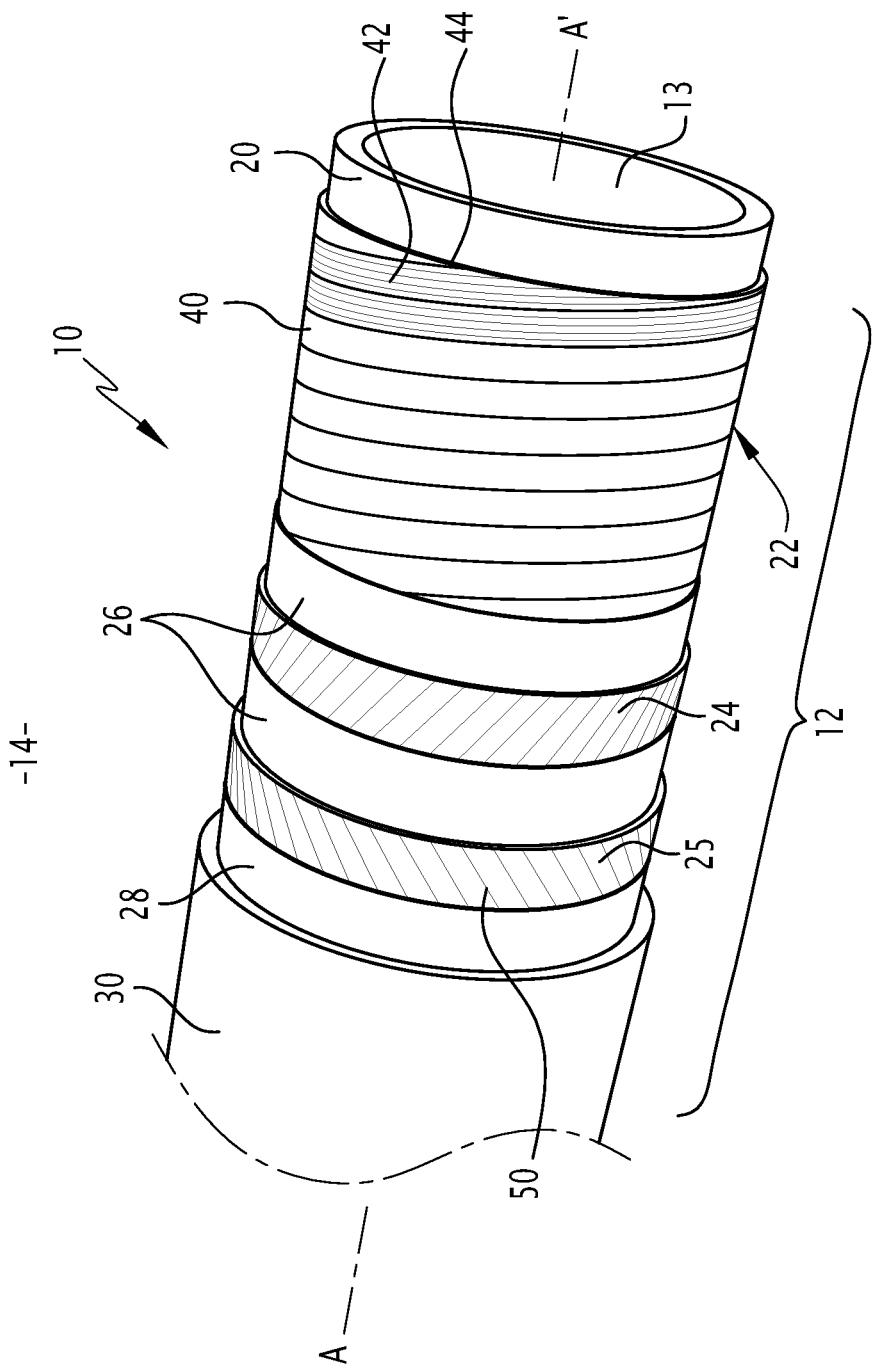
FIG. 1 is a partial cutaway perspective view of a first flexible pipe made in an installation comprising a compacting device according to the invention.

A first flexible pipe 10 made using a production installation 11 according to the invention (shown schematically in FIG. 2) is illustrated by FIG. 1.

The flexible pipe 10 includes a central segment 12 illustrated partially in FIG. 1. It includes, at each of the axial ends of the central segment 12, an end end-piece (not shown).

In reference to FIG. 1, the pipe 10 defines an inner passage 13 for the flow of a fluid, advantageously an oil fluid. The inner passage 13 extends along an axis A-A', between the upstream end and the downstream end of the pipe 10. It emerges through the endpieces.

The flexible pipe 10 is designed to be positioned through a body of water in a fluid exploitation installation, in particular for hydrocarbons. The body of water is for example a sea, lake or ocean. The depth of the body of water at the fluid exploitation installation is for example between 500 m and 4000 m. The fluid exploitation installation includes a surface assembly and a bottom assembly (not shown) or two surface assemblies that are advantageously connected to one another by the flexible pipe 10.

The surface assembly is for example floating. It is advantageously formed by a Floating Production, Storage and Offloading (FPSO) unit, a Floating Liquefied Natural Gas (FLNG) unit, a semisubmersible platform or an unloading buoy. In a variant, the surface assembly is a fixed rigid structure of the "jacket" type or an oscillating structure subject to the seabed that may for example be a TLP (Tension Leg Platform).

In this example, the flexible pipe 10 is a partially or fully submerged riser that connects the bottom assembly to the surface assembly. In a variant, the flexible pipe 10 is fully submerged in the body of water and for example connects two bottom assemblies (not shown) to one another.

Another variant consists of a flexible pipe 10 partially submerged in the body of water and for example connecting two surface assemblies (typically an unloading buoy and a FPSO). This is in particular the case for flexible lines of the OOL ("Oil Offloading Line") type.

As illustrated by FIG. 1, the pipe 10 delimits a plurality of concentric layers around the axis A-A', which extend continuously along the central segment 12 up to the end-pieces situated at the ends of the pipe.

In the example of FIG. 1, the pipe 10 includes at least one inner tubular polymer liner 20 advantageously making up a pressure liner, and a tubular reinforcing structure 22, applied around the tubular liner 20 and being connected thereto. In a variant, the pipe 10 has no inner tubular liner 20, the tubular reinforcing structure 22 then being tight.

In this example, the pipe 10 further includes a plurality of tensile armor plies 24, 25 positioned outwardly relative to the tubular reinforcing structure 22 while being unbonded to the tubular reinforcing structure 22.

Advantageously, and depending on the desired use, the pipe 10 further includes anti-wear layers 26, inserted between the tubular reinforcing structure 22 and the tensile armor plies 24, 25, as well as within the tensile armor plies 24, 25. It further advantageously includes a reinforcing tape 28, wound around the tensile armor plies 24, 25 and an outer liner 30, intended to protect the pipe 10.

In a known manner, the tubular liner 20 is designed to tightly confine the fluid transported in the passage 13. The tubular liner 20 also serves to protect the tubular reinforcing structure 22 from the abrasion related to the presence of abrasive particles, for example sand, within the fluid transported in the passage 13. The tubular liner 20 is formed from polymer material, preferably thermoplastic material. For example, the polymer forming the tubular liner 20 has a base of a polyolefin such as polyethylene, a base of a polyamide such as PA11 or PA12, or a base of a fluorinated polymer such as polyvinylidene fluoride (PVDF).

In a variant, the tubular liner 20 is made with a base of a high performance polymer such as PEK (polyether ketone), PEEK (polyether either ketone), PEEKK (polyetheretherketoneketone), PEKK (polyetherketoneketone), PEKEKK (polyetherketoneetherketoneketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid Crystal polymers), PPA (polyphthalamide) and/or mixtures thereof or in mixture with PTFE (polytetrafluoroethylene) or PFPE (perfluoropolyether).

The thickness of the tubular liner 20 is for example between 1 mm and 20 mm.

The tubular liner 20 is formed by a polymer tube, a strip of assembled polymer material, or a mast of impregnated polymer.

When the tubular liner 20 is formed by a tube, it is advantageously obtained by extrusion of a thermoplastic tube in particular chosen from the polymers mentioned above.

When the tubular liner 20 is formed by a strip of assembled polymer material, it is advantageously made by extrusion and winding of thermoplastic strips of a polymer as described above. Preferably, the turns of a first layer are touching (edge to edge without overlap) and the turns of an upper layer are arranged so as to overlap two adjacent lower strips, ensuring the tightness of the tubular liner 20.

According to the preferred embodiment, the flexible pipe 10 has no inner carcass, and is referred to as "smooth bore". The inner surface of the tubular liner 20 directly delimits the inner passage 13.

According to a variant that is not shown, the flexible pipe includes an inner carcass located inside the tubular liner 20, and it is referred to as "rough bore". The inner carcass serves to increase the collapse resistance of the flexible pipe, and it is for example formed by a profiled metal sheet, wound in a spiral. The turns of the sheet are advantageously stapled to one another, which makes it possible to react the collapse forces.

In this example, the tubular reinforcing structure 22 is applied directly on the tubular liner 20. It is assembled on the tubular liner 20 in the installation 11 to form a bonded assembly with the tubular liner 20.

The tubular reinforcing structure 22 here is a composite structure. It includes at least one, preferably a plurality of laminated composite reinforcing layers, and optionally an anti-delamination layer inserted between at least two reinforcing layers.

Each laminated reinforcing layer includes a superposition of composite reinforcing layers.

In the example shown in FIG. 1, each composite reinforcing layer includes a polymer matrix 40 and reinforcing fibers 42 embedded in the matrix 40.

Preferably, the matrix 40 is formed from a polymer, in particular a thermoplastic polymer. The polymer of the tubular liner 20 is advantageously of the same nature as that of the matrix 40. Within the meaning of the present invention, "of the same nature" means that the polymer of the tubular liner 20 and the polymer of the matrix 40 are able to melt and to form a close mixture, without phase separation, after cooling.

For example, the polymer forming the matrix 40 has a base of a polyolefin such as polyethylene, a base of a polyamide such as PA11 or PA12, or a base of a fluorinated polymer such as polyvinylidene fluoride (PVDF).

In a variant, the matrix 40 is made with a base of a high performance polymer such as PEK (polyether ketone), PEEK (polyether either ketone), PEEKK (polyetheretherketoneketone), PEKK (polyetherketoneketone), PEKEKK (polyetherketoneetherketoneketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid Crystal polymers), PPA (polyphthalamide) and/or mixtures thereof or in mixture with PTFE (polytetrafluoroethylene) or PFPE (perfluoropolyether).

In a variant, the polymer forming the matrix is a thermosetting polymer, in particular an epoxy resin.

Also in a variant, the matrix 40 is formed by a ceramic material.

The reinforcing fibers 42 are for example carbon fibers, glass fibers, aramid fibers and/or basalt fibers.

The reinforcing fibers 42 generally have a maximum tensile strength greater than 2 GPa, advantageously greater than 3 GPa, and for example between 3 GPa and 6 GPa, as measured at 23° C. according to standard ASTM D885M-10A(2014)e1.

In the present application, the terms "maximum tensile strength" and "tensile strength" have the same meaning and refer to the "ultimate tensile strength" measured during a tensile test.

Furthermore, the reinforcing fibers 42 advantageously have a tensile modulus greater than 50 GPa, for example between 70 GPa and 500 GPa, in particular between 50 GPa and 100 GPa for glass fibers, between 100 GPa and 500 GPa for carbon fibers and between 50 GPa and 200 GPa for aramid fibers, as measured at 23° C. according to Standard ASTM D885M-10A(2014)e1.

In the present application, the terms "tensile modulus", "Young's modulus" and "tensile elastic modulus" have the same meaning and refer to the modulus of elasticity measured during a tensile test.

The density of the reinforcing fibers 42 is generally between 1.4 g/cm$^3$ and 3.0 g/cm$^3$.

The reinforcing fibers 42 are for example arranged unidirectionally in the matrix 40. They are then parallel to one another. In a variant, the reinforcing fibers 42 are crossed along two orthogonal directions, or are arranged randomly in the matrix (not shown).

The length of the reinforcing fibers 42 in each composite layer is greater than 300 m, and is in particular between 300 m and 4500 m.

The diameter of the composite fibers is for example less than 100 microns, and is in particular between 4 microns and 10 microns.

Preferably, each composite reinforcing layer is formed by a winding of at least one composite strip 44 having several layers of fibers 42 embedded in an elongated matrix 40, with a length greater than at least 10 times its width and at least 10 times its thickness.

For example, the length of each composite strip 44 is greater than 100 m and is between 100 m and 4500 m. The width of each composite strip 44 is between 6 mm and 50 mm. The thickness of each composite strip 44 is between 0.1 mm and 1 mm.

Each composite strip 44 thus has, at 23° C., a tensile modulus greater than 10 MPa, in particular between 30 GPa and 170 GPa, as measured by Standard NF EN 2561, January 1996, an elongation at break greater than 1%, in particular between 1% and 5%, as measured by Standard NF EN 2561, January 1996, and a maximum tensile strength greater than 100 MPa, and in particular between 350 MPa and 3500 MPa as measured by Standard NF EN 2561, January 1996.

Advantageously, each composite strip 44 includes a matrix made from PEEK or PVDF reinforced by unidirectional carbon fibers oriented parallel to the longitudinal axis of the strip.

As will be seen later, during the production of each reinforcing layer, the or each composite strip 44 is wound in a helix around the axis A-A' of the tubular liner 20, and is heated to cause the partial melting of the matrix 40 (in the case where the matrix 40 is a thermoplastic), and the bonding with the successive turns of the composite strip 44, and/or with the adjacent layers, which may be other reinforcing layers, anti-delamination layers or the tubular liner 20.

The absolute value of the winding helix angle γ of each composite strip 44 relative to the axis A-A' of the pipe 10 is for example between 50° and 85°, preferably between 55° and 80°. This ensures an elongation of the composite under the effect of the internal pressure, and an adequate cooperation with the armor plies 24, 25.

The thickness of each composite layer is generally between 0.10 mm and 0.30 mm, for example between 0.12 mm and 0.17 mm, or between 0.22 mm and 0.27 mm.

In the example shown in FIG. 1, the flexible pipe 10 includes an inner armor ply 24, and an outer armor ply 25 around which the outer liner 30 is positioned.

Each armor ply 24, 25 includes longitudinal armor elements 50 wound with a long pitch around the axis A-A' of the pipe.

"Wound with a long pitch" means that the absolute value relative to the axis A-A' of the helix angle is less than 50°, and is typically between 25° and 45°.

The armor elements 50 of a first ply 24 are generally wound with an opposite angle relative to the armor elements 50 of a second ply 25. Thus, if the winding angle relative to the axis A-A' of the armor elements 50 of the first ply 24 is equal to +φ, φ being between 25° and 45°, the winding angle relative to the axis A-A' of the armor elements 50 of the second ply 25 positioned in contact with the first ply 24 is for example −φ, with φ between 25° and 45°.

The armor elements 50 are for example formed by metal wires. In a variant, the armor elements 50 are formed by metal wires or flat composite tapes filled with carbon fibers.

The combination of a winding angle γ of the composite strips 44 with absolute value between 50° and 85°, advantageously between 55° and 80°, preferably between 60° and 80°, with a winding angle φ of the armor elements 50 with absolute value between 25° and 45°, prevents the elongation of the tubular reinforcing structure 22 by compensating effect produced by the armor plies 24, 25.

The tubular reinforcing structure 22 being able to have a low tensile strength and tending to become elongated under the effect of axial forces, the armor plies 24, 25 take up the axial forces and thus prevent the elongation of the tubular reinforcing structure 22.

The optimal combination between the winding angles γ, φ drastically reduces the stresses in the tubular assembly formed by the inner liner 20 and the tubular reinforcing structure 22, and therefore the thickness necessary to withstand the bending, internal pressure and/or collapse forces.

Furthermore, owing to the axial stiffness of the tubular reinforcing structure 22, the tensile armor plies 24, 25 better withstand the axial compression under the external pressure conditions of the ocean floor.

Furthermore, the winding angle φ of the armor elements 50 with absolute value between 25° and 45°, taken in combination with the winding angle γ of the composite strips 44 with absolute value between 50° and 85°, allows a compression of the tubular reinforcing structure 22, reducing the minimum bending radius (MBR).

The acceptable tensile strain on the convex side of the tubular assembly formed by the inner liner 20 and the tubular reinforcing structure 22 is greater than 1%, advantageously greater than 2%, preferably greater than 3%. This strain induces the winding radius compatible with most production and installation equipment.

The outer liner 30 is designed to prevent the permeation of fluid from the outside of the flexible pipe 10 toward the inside. It is advantageously made from a polymer material, in particular with a base of a polyolefin, such as polyethylene, a base of a polyamide, such as PA11 or PA12, or a base of a fluorinated polymer, such as polyvinylidene fluoride (PVDF).

The thickness of the outer liner 30 is for example between 5 mm and 15 mm. Each anti-wear layer 26 is for example formed by PA (polyamide), PE (polyethylene), PVDF (polyvinylidene fluoride), PEEK (polyether ether ketone), PEKK (polyetherketoneketone). An anti-wear layer 26 is arranged between the tubular reinforcing structure 22 and the first tensile armor ply 24. Another anti-wear layer 26 is placed between each pair of armor plies 24, 25, advantageously as indicated in Standard API 17J, 4th edition May 2014.

The reinforcing tape 28 is for example formed by an anti-buckling layer of high strength. This layer is for example made from aramid. The tape is wound around the outermost armor ply 25, between the armor ply 25 and the outer liner 30, advantageously as indicated in Standard API 17J, 4th edition May 2014.

Figure 2:
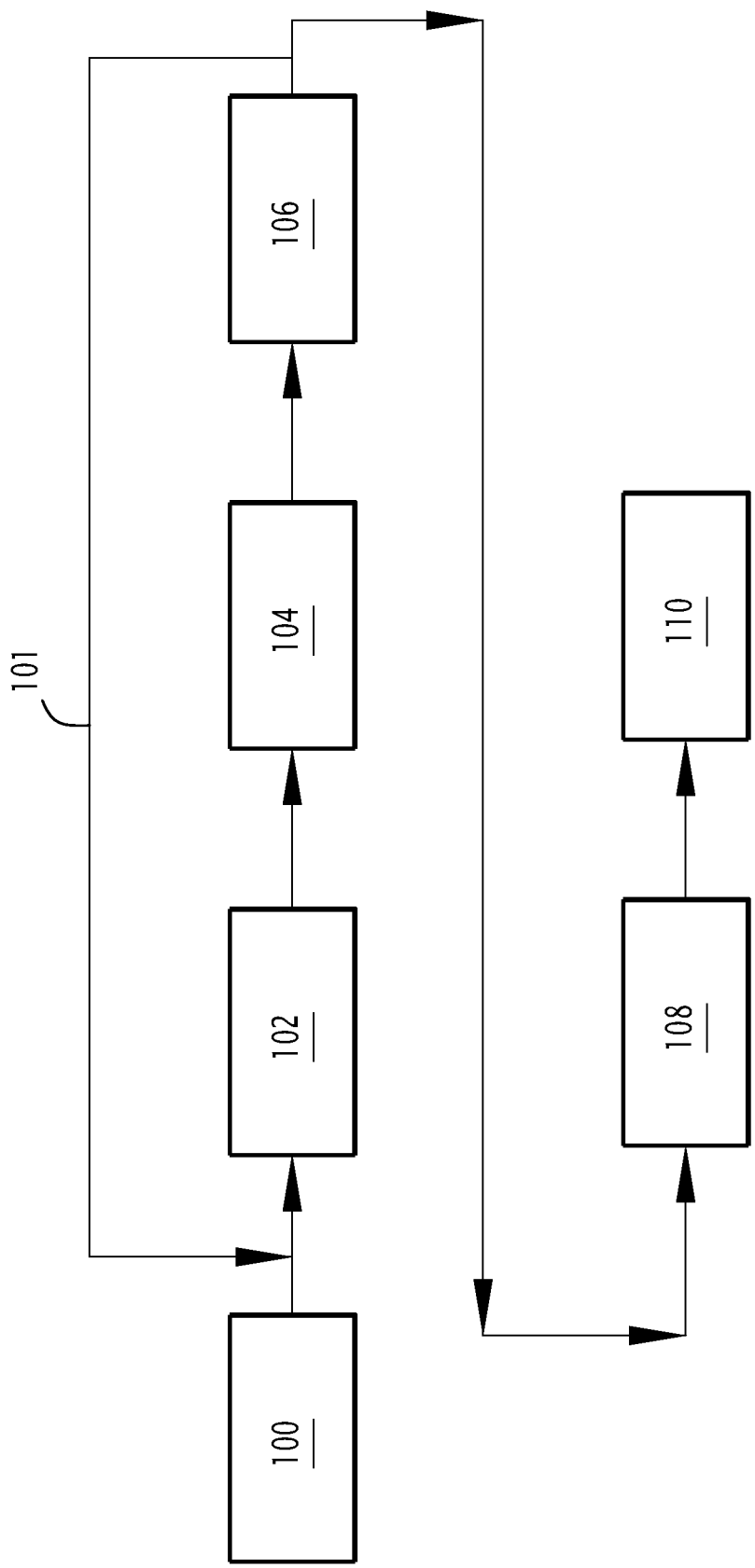
FIG. 2 is a schematic view of the production installation according to the invention.
Figure 3:
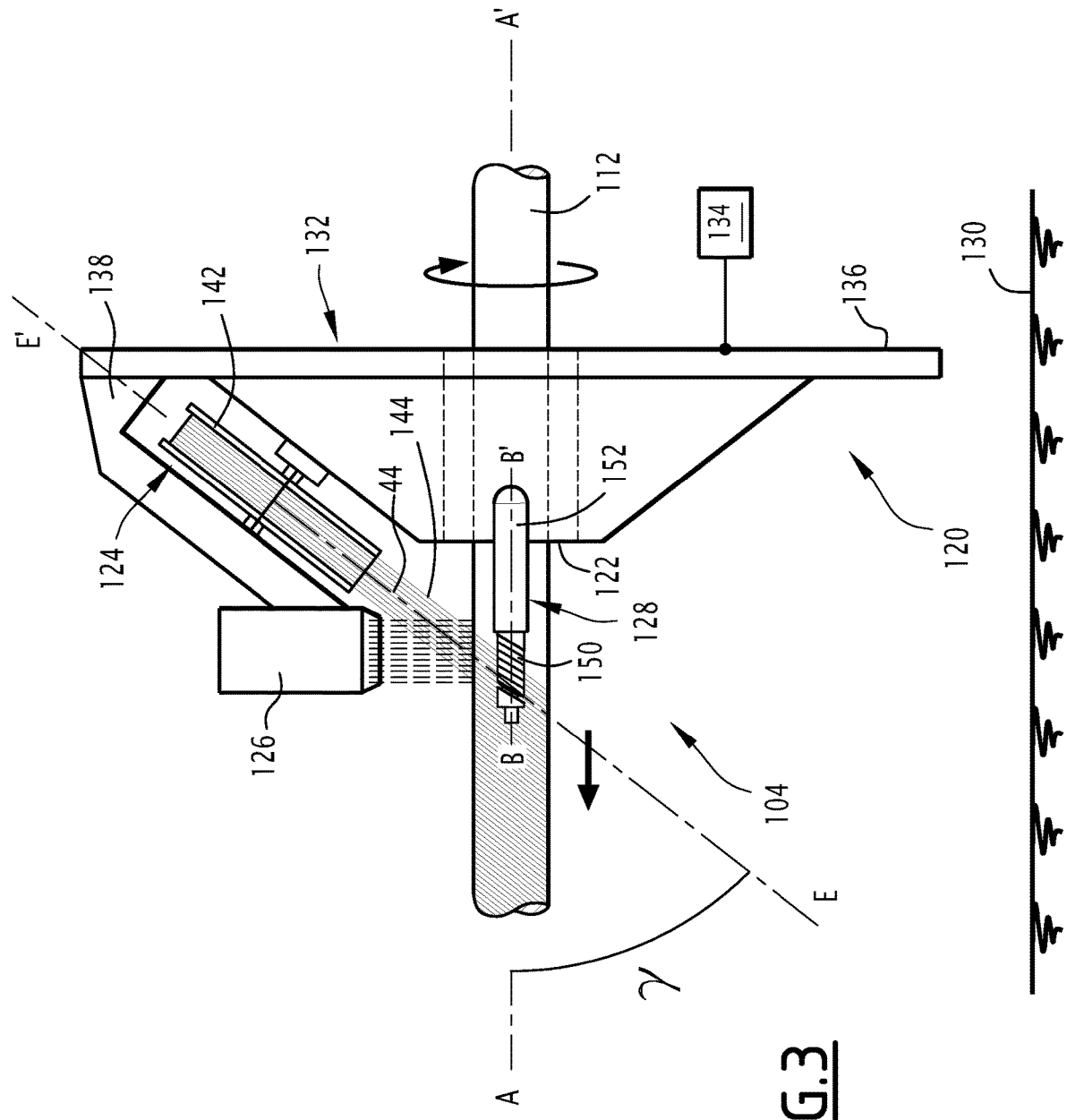
FIG. 3 is a simplified schematic side view of a station for forming a tubular structure of the pipe according to the invention including a strip winding apparatus and a heating apparatus.
Figure 4:
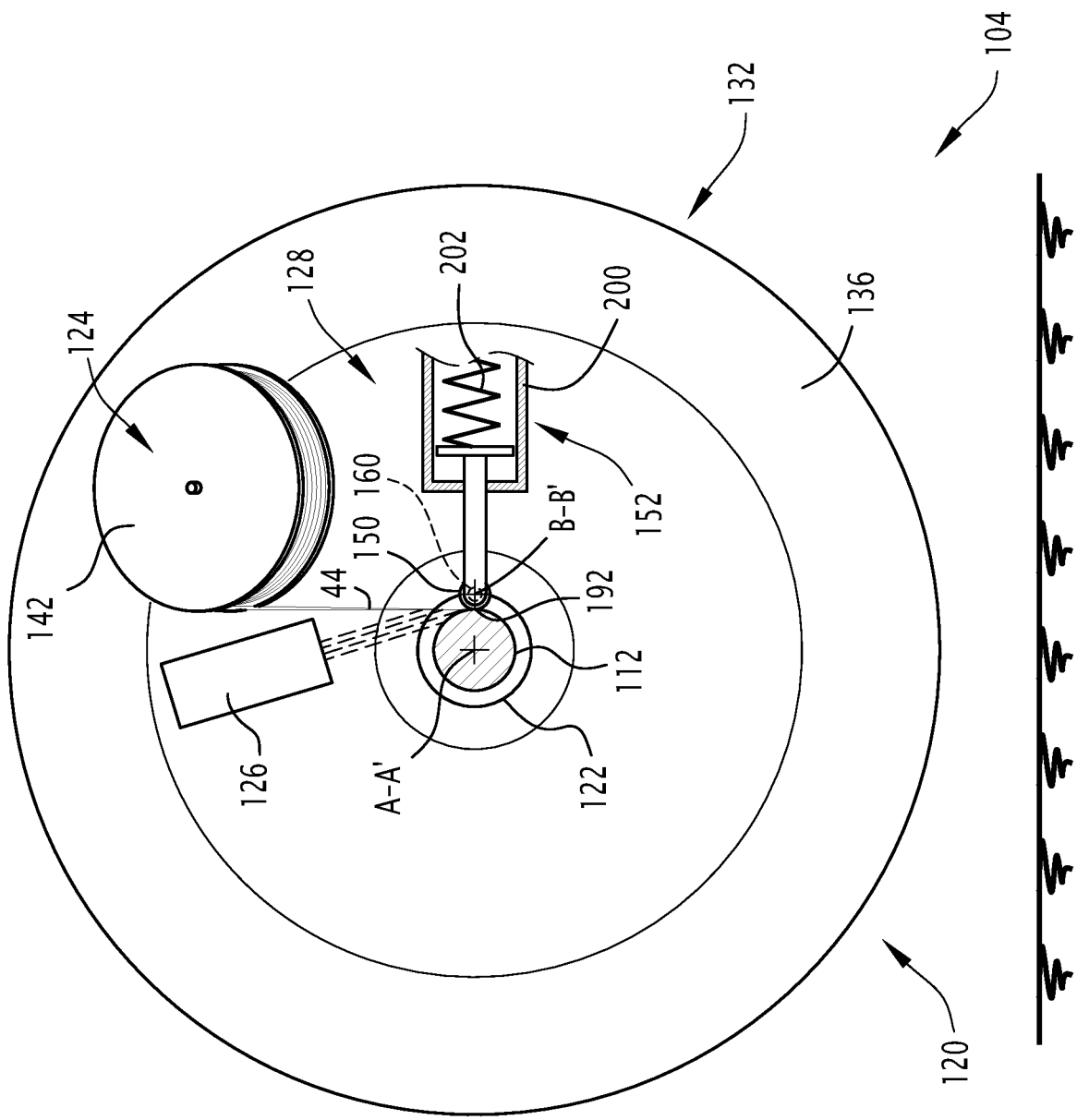
FIG. 4 is a cross-sectional view of the forming station of FIG. 3.

The flexible pipe 10 according to the invention is manufactured in the installation 11 shown schematically in FIGS. 2 to 4.

As illustrated in FIG. 2, the installation 11 includes a station 100 for supplying the liner 20, optionally a pre-compacting station 102, a station 104 for forming the tubular structure 22 and optionally a post-compacting station 106.

The installation 11 advantageously includes a station 108 for winding armor layers 24, 25 and a station 110 for forming the outer liner 30.

The station 100 for supplying the liner 20 is able to produce and/or unwind the liner 20 along a longitudinal axis A-A', so that it may be introduced into the successive stations 102, 104, 106. The liner 20 thus defines a cylindrical outer surface 112 (see in particular FIG. 3) on which the tubular structure 22 is formed.

The forming station 104 is illustrated schematically in FIGS. 3 and 4. It includes a frame 120 delimiting a central passage 122 for circulation of the liner 20 along a central axis A-A', a winding apparatus 124 parallel to a plurality of strips 44 over the outer surface 112 defined here by the liner 20, and at least one apparatus 126 for heating the strips 44.

The forming station 104 further includes a compacting device 128 according to the invention illustrated in more detail in FIGS. 5 to 11.

The frame 120 here includes a fixed structure 130, fixed on the ground, at least one rotary support element formed by a mobile cage 132 mounted rotatably on the fixed structure 130 about the central axis A-A', and a mechanism 134 for rotating the mobile cage 132 relative to the fixed structure 130.

The mobile cage 132 includes a drum 136 rotating about the central axis A-A' and a support 138 borne by the drum 136 away from the central axis A-A'.

The central passage 122 passes through the drum 136.

The winding apparatus 124 is mounted on the support 138 of the mobile cage 132 in order to be rotated jointly with the mobile cage 132 about the axis A-A'.

The winding apparatus 124 includes a plurality of unwinders 142, and guide elements 144 of the strips 44 from each unwinder 142 in order to guide them toward the outer surface 112 while keeping them parallel.

Each unwinder 142 is able to respectively unwind at least one strip 44 intended to form a reinforcing layer.

Each unwinder 142 includes at least one coil on which at least one strip 44 is wound.

The guide elements 144 include guides for aligning strips parallel to one another along an axis E-E' that is inclined relative to the central axis A-A' by an angle equal to the helix angle γ, in order to allow the winding in a helix of the strips 44 coming from each unwinder 142 around the outer surface 112 during the rotation of the mobile cage 132 around the axis A-A'.

The heating apparatus 126 is also borne by the support 138 of the mobile cage 132. It is placed opposite the outer surface 112, at the application region of the strips 44 on the outer surface 112. It for example includes a laser, a lamp, in particular a xenon lamp, an infrared lamp, a pulsed light device, an ultrasonic bonding device and/or a hot air blowing device. The heating apparatus 126 is able to soften, advantageously to melt, the thermoplastic matrix 40 of the strip 44 in order to allow its complementary application on the outer surface 112.

In this example, the compacting device 128 includes a common frame with the frame 120 of the forming station 104. It includes at least one roller assembly 150 borne by the mobile cage 132 in order to be rotated jointly with the mobile cage 132 about the central axis A-A' relative to the outer surface 112. The compacting device 128 further includes an approach mechanism 152, able to move each roller assembly 150 toward the central axis A-A'.

Figure 5:
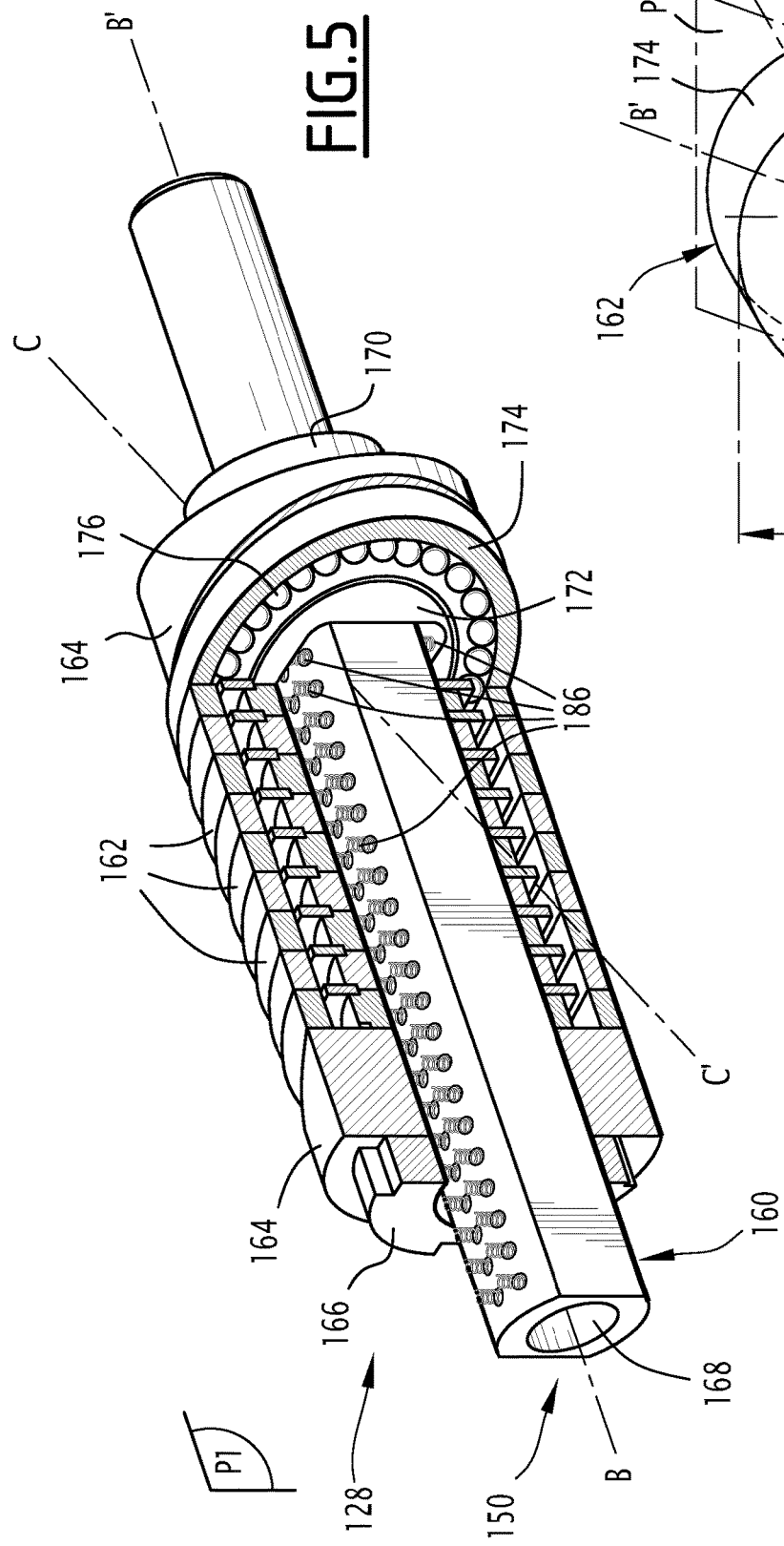
FIG. 5 is a partially exploded perspective view illustrating a roller assembly of the compacting device according to the invention.

In reference to FIG. 5, the roller assembly 150 includes a straight central shaft 160, with central axis B-B' parallel to the axis A-A', and a plurality of parallel rollers 162 mounted rotating about an axis C-C' that is inclined relative to the axis B-B' by an angle α.

In this example, the roller assembly 150 further includes endpieces 164, located longitudinally on either side of the rollers 162 of the roller assembly 150, and a blocking member 166 of the stack of rollers 162 and the endpieces 164 on the central shaft 160.

The central shaft 160 is mounted immobile in rotation about its axis B-B'. In this example, it defines a central opening 168 for circulation of a heat transfer fluid, for the circulation of a heat transfer fluid intended to cool the rollers 162. This in particular makes it possible to cool the rollers 162 when the heating apparatus 126 heats the strips 44 to a high temperature, typically above 350° C., in particular when the strips 44 have a thermoplastic matrix 40 made from PEEK.

The central shaft 160 is provided at one end with a radial skirt 170 intended to block the translation along the axis B-B' of the stack of rollers 162 and the endpieces 164. In this example, the central shaft 160 has a cross-section of non-circular contour.

This contour is for example a polygonal contour, in particular a rectangular or square contour.

Figure 10:
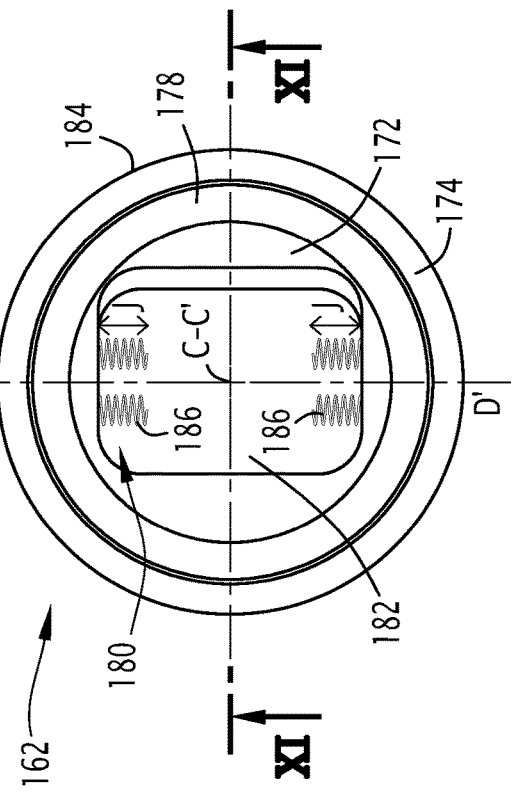
FIG. 10 is a side view of the roller assembly of FIG. 5.

In reference to FIGS. 10 and 11, each roller 162 includes an inner ring 172 mounted fixed in rotation on the central shaft 160, and an outer ring 174 mounted rotating on the inner ring 172 about the axis C-C'.

Advantageously, each roller 162 further includes an inner rolling bearing 176 inserted between the inner ring 172 and the outer ring 174, and optionally lateral flanges 178 for maintaining the inner rolling bearing 176.

In the example shown in FIGS. 10 and 11, each roller 162 is mounted movably perpendicular to its axis of rotation C-C' on the central shaft 160, between a central idle position and off-centered positions. In this case, it includes a mechanism 186 for resiliently biasing the roller 162 toward its central position. The mechanism 186 is for example formed by a spring inserted into a hole arranged in the central shaft 160.

In this example, the inner ring 172 and the outer ring 174 are made from metal, in particular steel.

The inner ring 172 defines a central through hole 182 in which the central shaft 160 is engaged.

The central hole 182 extends along an axis B-B' inclined by an angle α relative to the axis of rotation C-C' of the roller 162. The central hole 182 has a cross-section similar to the outer cross-section of the central shaft 160, but not conjugated with the outer cross-section of the central shaft 160 along at least one movement direction D-D'.

Thus, the inner ring 172 is mounted on the central shaft 160 with play J in the hole 182 along the direction D-D' allowing the mobility of the inner ring 172 in translation, perpendicular to the axis of rotation C-C', while keeping the inner ring 172 fixed in rotation about the axis B-B' of the shaft.

The outer ring 174 has a cylindrical outer surface 184 intended to be applied on the strips 44 of the tubular structure 22.

It is mounted freely rotating about the axis C-C' relative to the inner ring 172 and the central shaft 160. The axis C-C' defines, with the axis B-B', an angle α that is equal to 90° minus the helix angle γ of the strips 44 of the tubular structure 22 advantageously to within plus or minus five degrees, preferably to within plus or minus three degrees. Ideally, the angle α must be chosen to be equal to 90° minus the helix angle γ so as to minimize the relative slipping between the strip 44 and the roller 162 during compacting. However, it has been observed that it is possible to move three to five degrees away from the optimum angle without significantly degrading the quality of the tubular structure 22, which makes it possible in practice to reduce the number of different roller assemblies that are necessary to cover a range of helix angles γ.

The angle α is for example less than 40° and is in particular between 10° and 30°.

The axes C-C' of rotation of the successive rollers 162 are parallel to one another, while being offset relative to one another.

The width L of each roller 162, taken at the outer surface 184, parallel to the axis C-C', is less than 15 mm, advantageously less than 10 mm, more advantageously less than 8 mm, preferably between 4 mm and 7 mm.

This width L is generally less than the width of the strip 44. For example, a roller assembly 150 including four rollers 162 with unitary width L equal to 6 mm can be used to compact a strip 44 with width equal to 20 mm.

Furthermore, the diameter D of each roller 162, taken at the peripheral surface 184, is generally greater than 50 mm and is advantageously between 60 mm and 150 mm.

The rolling bearing 176 includes a plurality of balls 184 arranged between the inner ring 172 and the outer ring 174.

The lateral flanges 178 protrude radially at the periphery of the inner ring 172. They laterally retain the balls 184 of the rolling bearing 176.

When it is present, the biasing mechanism 180 includes at least one spring 186 arranged in the central passage 182 at the play J between the central shaft 160 and the inner ring 172.

Preferably, the biasing mechanism 180 includes at least two opposite springs 186 in order to bias the roller 162 toward its central position in the two excursion directions D-D' relative to the central position.

Each endpiece 164 is formed by a collar engaged around the shaft 160 and having a first lateral stop surface 188 perpendicular to the axis B-B', and a second lateral bearing surface 190 for the rollers 162 located in a plane inclined by the angle γ relative to the axis B-B'.

The stop surface 188 of a first endpiece 164 abuts against the skirt 170. The bearing surface 190 of the first endpiece 164 is arranged in contact with an end roller 162 of the roller assembly 150.

The stop surface 188 of a second endpiece 164 is located in contact with the blocking member 166. The bearing surface 190 of the second endpiece 164 is arranged in contact with another end roller of the roller assembly 150, opposite the bearing surface 190 of the first endpiece 164.

Thus, the rollers 162 of the roller assembly 150 are mounted in the space between the bearing surfaces 190, optionally with functional play between them, smaller than the width of the roller 162.

The blocking member 166 is fixed on the central shaft 160 in order to define the relative position of the endpieces 164, and the functional play between the rollers 162 of the roller assembly 150.

Figure 7:
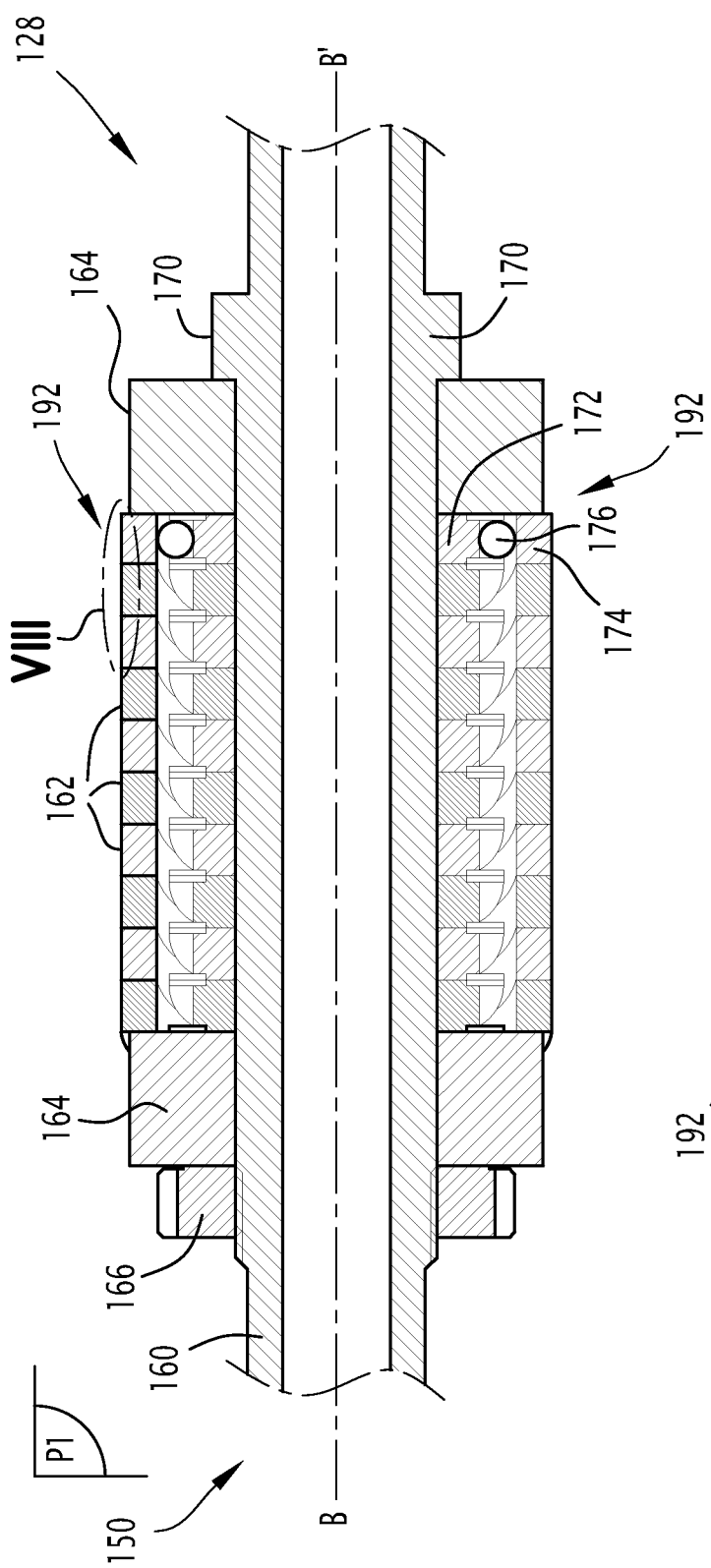
FIG. 7 is a sectional view along a first median axial plane of the roller assembly of FIG. 5.
Figure 9:
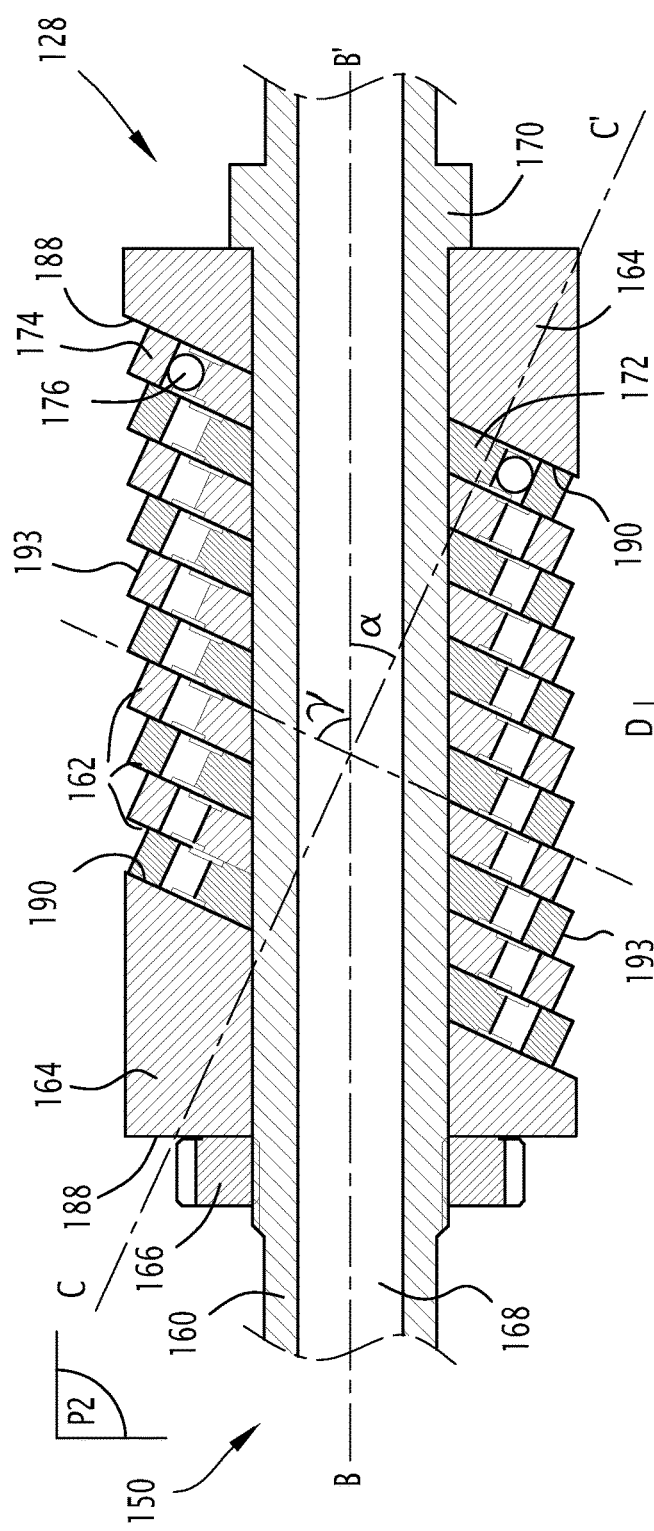
FIG. 9 is a sectional view along a second median axial plane of the roller assembly of FIG. 5.

As illustrated in FIGS. 5, 7 and 9, the rollers 162 of the roller assembly 150 define, in a median axial plane P1 visible in FIGS. 5 and 7, two pseudo-linear and pseudo-planar compacting generatrixes 192. On the contrary, in at least one other median axial plane P2, shown in FIG. 9, the generatrixes 193 defined by the rollers 162 of the roller assembly 150 define successive macroscopic teeth.

Figure 6:
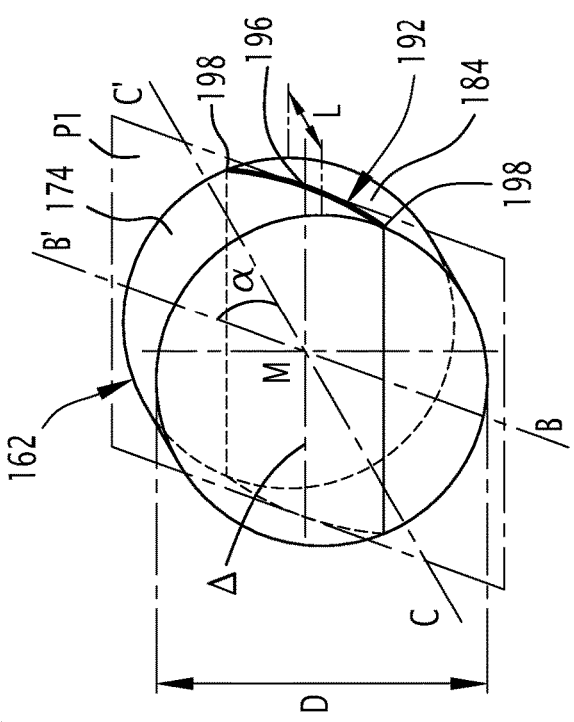
FIG. 6 is a view schematically illustrating the orientation of a roller in the roller assembly of FIG. 5.
Figure 8:
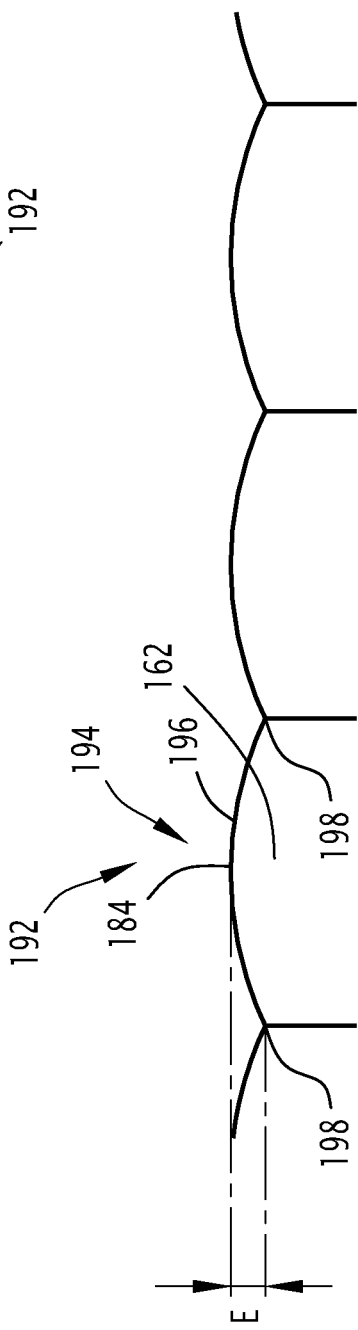
FIG. 8 is an enlarged view with exaggerated dimensions of a detail marked VIII illustrating a substantially planar generatrix of the roller assembly of FIG. 5.

FIG. 8 shows an exaggerated illustration of the dimensions of each compacting generatrix 192 along the rollers 162. As shown in FIG. 6, the compacting generatrix 192 is defined on each roller 162 by the intersection between the cylindrical peripheral surface 184 of the outer ring 174 and the median axial plane P1. The median axial plane P1 contains the axis B-B' and the line A. The line A is the line that passes through the center M of the cylindrical surface 184, and that is perpendicular to the axes C-C' and B-B'.

Each segment 194 of the generatrix 192 located on a roller 162 thus has a micro-boss shape having an apex 196 and two lateral ends 198 on the edges of the roller 162. Each micro-boss has a height E that is advantageously less than one third of the thickness of the strip 44, preferably less than one fifth of the thickness of the strip 44. Thus, the height of the micro-bosses is significantly less than the thickness of the strip 44, such that the compacting pressure applied by the roller assembly 150 along the generatrix 192 is substantially uniform and the fibers present in the matrix of the strip 44 are not disorganized during compacting.

This height E is generally less than 0.2 mm, advantageously less than 0.1 mm and preferably less than 0.05 mm, in particular when the diameter of each roller 162 is between 60 mm and 100 mm, when the width L of each roller 162 is between 5 mm and 7 mm and when the helix angle γ is between 60° and 70°.

The tables below illustrate the heights E that may be obtained for different diameters D of rollers, helix angles γ and widths L of rollers 162.

| γ (degrees) | α (degrees) | D (mm) | L (mm) | E (mm) |
| --- | --- | --- | --- | --- |
| 50 | 40 | 60 | 5 | 0.07 |
| 50 | 40 | 60 | 6 | 0.11 |
| 50 | 40 | 60 | 7 | 0.14 |
| 50 | 40 | 60 | 8 | 0.19 |
| 60 | 30 | 60 | 7 | 0.07 |
| 65 | 25 | 60 | 7 | 0.04 |

The height E decreases when the diameter D increases, as shown by the following table:

| γ (degrees) | α (degrees) | D (mm) | L (mm) | E (mm) |
| --- | --- | --- | --- | --- |
| 50 | 40 | 50 | 6 | 0.13 |
| 50 | 40 | 60 | 6 | 0.11 |
| 50 | 40 | 70 | 6 | 0.09 |
| 50 | 40 | 80 | 6 | 0.08 |
| 50 | 40 | 90 | 6 | 0.07 |
| 50 | 40 | 100 | 6 | 0.06 |

The height E is a decreasing function of the angle α and therefore an increasing function of the angle γ, as shown by the following table:

| γ (degrees) | α (degrees) | D (mm) | L (mm) | E (mm) |
| --- | --- | --- | --- | --- |
| 30 | 60 | 60 | 6 | 0.45 |
| 40 | 50 | 60 | 6 | 0.21 |
| 50 | 40 | 60 | 6 | 0.11 |
| 60 | 30 | 60 | 6 | 0.05 |
| 70 | 20 | 60 | 6 | 0.02 |
| 80 | 10 | 60 | 6 | 0.005 |

Hereinafter, knowing the thickness of the strip 44 and the helix angle γ, it is possible to determine the diameter D and the width L of the rollers 162 making it possible to obtain a compacting generatrix 162 having micro-bosses of amplitude E significantly less than the thickness of the strip 44, for example of amplitude E less than one fifth of the thickness of the strip 44. In practice, the width L of the rollers 162 should first be minimized by accounting for the industrial production and assembly constraints, for example a width L should be chosen of the order of 5 mm to 7 mm, then the diameter D of the rollers 162 should be increased until the amplitude E is below the desired value.

Such dimensions ensure effective compacting of the strips 44, without disorganization of the fibers 42 present in the matrix owing to the pseudo-linearity and the pseudo-flatness of the compacting generatrixes 192.

Advantageously, the roller assembly 150 includes at least eight rollers 162, preferably at least twenty rollers 162, which makes it possible to install and simultaneously compact several strips 44 and thus to increase the production speed of the forming station 104. For example, it is possible with a single roller assembly 150 to install and simultaneously compact ten strips 44 of unitary width 25 mm on a cylindrical outer surface 112 with an outer diameter of 150 mm, when this roller assembly 150 includes forty rollers 162 each having a width L equal to 6.5 mm. The solutions of the prior art based on the use of non-segmented cylindrical rollers have an inferior productivity, since under the same conditions, a non-segmented roller can at most compact a single strip with a maximum width of the order of 20 mm in a satisfactory manner.

In reference to FIG. 4, the approach mechanism 152 includes a support 200 of the roller assembly 150, transversely mobile relative to the central axis A-A', and at least one member for resilient biasing 202 of the roller assembly 150 toward the central axis A-A' biasing the support 200 and the roller assembly 150 toward the central axis A-A'.

On the support 200, the shaft 160 is mounted with its axis B-B' parallel to the axis A-A'. At least one compacting generatrix 192 is arranged opposite the axis A-A', parallel to the axis B-B' to be applied on the strips 44, after the winding on the outer surface 112.

Preferably, at least one roller 162 is applied individually on a respective strip 44, the roller 162 being inclined by an angle corresponding to the helix angle γ, as illustrated in FIG. 3.

Thus, each roller 162 is able to roll on the strip 44 on which it is applied while describing a helix of equal pitch and the same direction as the strip 44, while exerting a compacting pressure oriented radially relative to the central axis of the tubular structure 22.

In reference to FIG. 12, the post-compacting station 106 is located downstream of the forming station 104. In reference to FIG. 12, it includes a fixed heating apparatus 126, and at least one compacting device 128 mounted rotating on a mobile cage 132 of a frame 120.

The heating apparatus 126 is for example a furnace intended to soften the surface of the tubular structure 22. It for example includes a plurality of lamps 210 distributed around the central axis A-A', upstream of each compacting device 128 along the axis A-A'.

The mobile cage 132 is able to be rotated about the axis A-A' during the scrolling of the tubular structure 22 opposite the heating apparatus 126.

Figure 13:
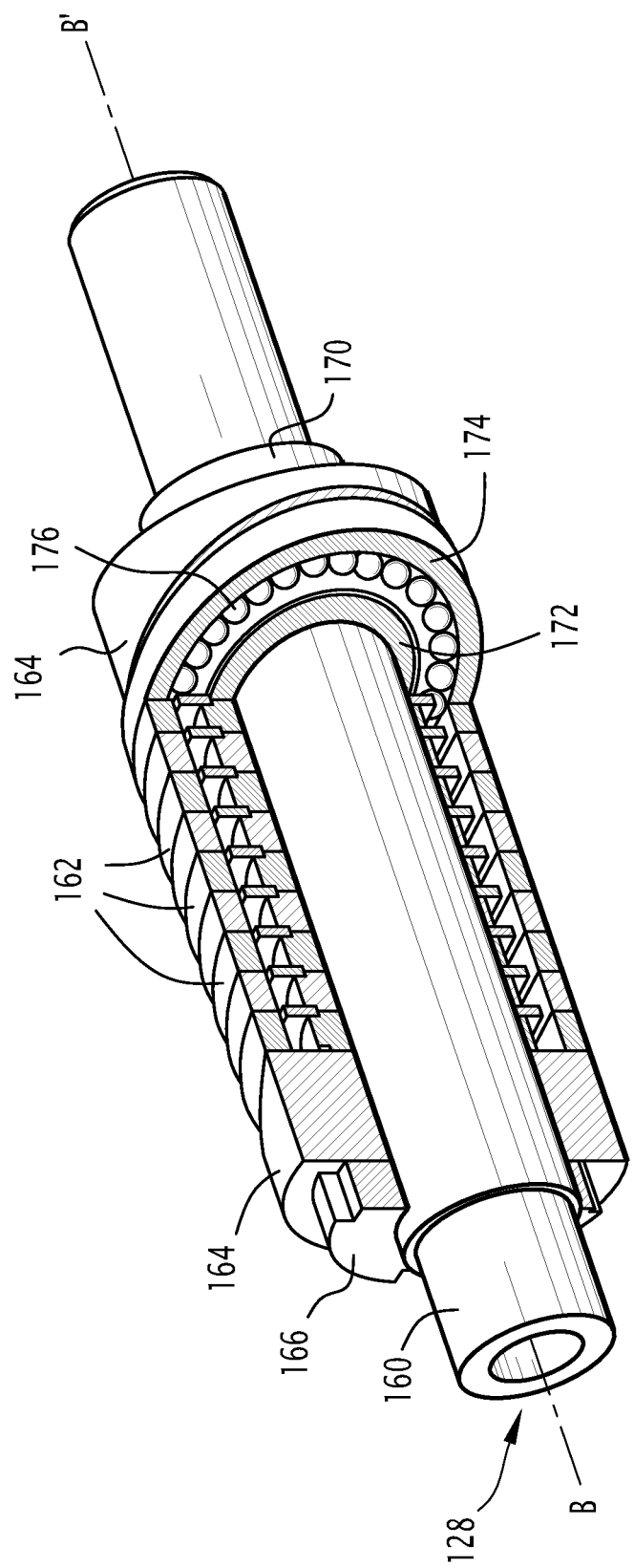
FIG. 13 is a view similar to FIG. 5 of the compacting device of FIG. 12.

As illustrated by FIG. 13, the compacting device 128 includes a plurality of roller assemblies 150 distributed around the tubular structure 22. It includes, for each roller assembly 150, an approach mechanism 152 as previously described the forming station 104.

Each roller assembly 150 has a structure similar to that previously described. However, unlike the roller assembly 150 of the forming station 104, the roller assembly 150 described in FIG. 13 includes a central shaft 160 having a cross-section of circular contour. The inner ring 172 of each roller 162 is mounted without transverse play on the central shaft 160. Each roller 162 therefore has no biasing mechanism 180.

At least one roller assembly 150 is advantageously provided with a force sensor in order to determine the pressure applied on the strips 44 by the rollers 162 and to control the radial position of the roller assembly 150 based on the measured pressure.

The pre-compacting station 102 has a structure similar to that of the post-compacting station 106. It is arranged upstream of the forming station 104 in order to allow the softening of the liner 20, and the preparation of the outer surface 112 to make it as cylindrical as possible and to promote the adherence of the strips 44.

The winding station 108 of the armor plies 24, 25 is located downstream of the post-compacting station 106. It includes apparatuses (not shown) for winding the armor elements 50 in a helix in order to successively form the plies 24, 25.

The station for forming the outer liner 110 is located downstream of the winding station 108. It for example includes an apparatus (not shown) for extrusion of the outer liner 30.

The method for manufacturing a tubular structure 22 according to the invention will now be described in the installation 11, in the example of the embodiment of a flexible pipe 10.

Initially, the liner 20 is manufactured and/or is supplied in the supply station 100. It is brought to the station 104 for forming the structure 22, and is translated through the forming station 104 of the structure 22 along the axis A-A' by a translational driving device.

Advantageously, before the station 104, the liner 20 enters the pre-compacting station 102. The liner 20 first enters the heating apparatus 126, to bring its outer surface 112 to a temperature above 100° C., and in particular between 100° C. and 350° C.

The roller assemblies 150 are rotated around the liner 20. The rollers 162 are applied on the outer surface 112 to make it as cylindrical as possible.

Then, the liner 20 is introduced into the central passage 122 of the forming station 104.

In this station 104, a plurality of reinforcing layers are formed from the strips 44.

For each reinforcing layer, a plurality of strips 44 are unwound in parallel from unwinders 142 of the winding apparatus 124. The guide elements 144 keep the strips 44 parallel to one another, with controlled play.

The parallel strips 44 pass in front of the heating apparatus 126, where they are advantageously heated to a temperature between 150° C. and 450° C., said temperature depending on the nature of the thermoplastic polymer making up the matrix 40 of the strips 44.

When the matrix 40 of the strips 44 is made from PEEK (melting point of the order of 350° C.), the heating temperature of the strips 44 by the heating apparatus 126 is advantageously between 350° C. and 450° C., preferably between 380° C. and 420° C. When the matrix 40 of the strips 44 is made from PVDF (melting point of the order of 180° C.), the heating temperature of the strips 44 by the heating apparatus 126 is advantageously between 180° C. and 280° C., preferably between 200° C. and 250° C. This advantageously causes at least partial melting of the matrix 40.

The mobile cage 132 being rotated about the axis A-A', and the liner 20 being translated along the axis A-A', the strips 44 are wound in a helix around the outer surface 112 defined by the liner 20 or defined by a layer formed around the liner 20, with a helix angle equal to γ.

Just after their winding, the roller assembly 150 rotated jointly with the mobile cage 132 is applied on the strips 44.

To that end, as previously indicated, the successive rollers 162 define a compacting generatrix 192 that bears on the strips 44.

The orientation angle of the rollers being equal to a, the rollers 162 roll on the strips 44 along the local axis of the strip 44.

Furthermore, the height E of the micro-bosses defined by the compacting generatrix 192 being less than three times the thickness of the strip 44, preferably less than five times the thickness of the strip 44, the compacting generatrix 192 is pseudo-linear and extends substantially in a plane.

The strips 44 are therefore compacted uniformly, while avoiding the disorganization of the fibers 42 present in the matrix 40, all while ensuring an effective distribution of the molten material of the matrix 40 in order to form a continuous and tight tubular structure 22.

Then, the tubular structure 22 thus formed enters a post-compacting station 106.

The outer surface 112 of the tubular structure 22 is then softened upon entering the heating apparatus 106, then is compacted again by rotary roller assemblies 150. The rollers 162 of the roller assemblies 150 roll along a helix-shaped trajectory along respective strips 44, ensuring a minimal disorganization of the reinforcing fibers 42.

Advantageously, the operations of pre-compacting (station 102), forming of the tubular structure (station 104) and post-compacting (station 106) are repeated (loop 101 in FIG. 2) in order to form other reinforcing layers with other strips 44, as previously described.

The tubular structure 22 is thus produced layer by layer by adding, upon each passage in the station 104, a new outer layer with a thickness substantially equal to that of a strip 44. These operations can be repeated dozens of times, in particular when the strip(s) 44 have a thickness significantly smaller than the final thickness of the wall of the tubular structure 22.

Additionally, the characteristics of the strips 44 and/or the installation and/or compacting parameters can be modified each time a new layer is added. For example, it is possible to modify the helix angle of the strips 44, in particular to cross the fibers of two superimposed layers.

Next, the tubular structure 22 enters the winding station 108, to allow the placement of the armor plies 24, 25.

The armor elements 50 of the tensile armor plies 24, 25 are wound around the tubular reinforcing structure 22, in a manner unbonded with the tubular reinforcing structure 22. Advantageously, an anti-wear layer 26 is inserted between the tubular reinforcing structure 22 and the first tensile armor ply 24, and between each pair of tensile armor plies 24, 25.

Then, a reinforcing tape 28 is wound around the outermost tensile armor ply 25.

Next, in the forming station of the outer liner 110, the outer liner 30 is formed around the armor plies 24, 25.

The compacting ensured by the rollers 162 in the station for forming the structure 22, then in the post-compacting station 106, reinforces the mechanical properties of the tubular structure 22, in particular by offering an increased inter-laminar mechanical strength, a greater crystallinity level, and a decreased porosity level.

The tubular structure 22 is therefore more mechanically robust and has improved tightness with respect to the fluid intended to circulate in the inner passage 13.

Owing to the particular orientation of the rollers 162 on the central shaft 160, the rollers 162 are able to roll on the strips 44 of the tubular structure 22, while minimizing the disorganization of the fibers present in the matrix 40.

In a variant, each roller 162 includes a bearing of the ring type in place of the balls 184, which improves the heat transfer between the central shaft 160 and the outer ring 174 and thus allows better cooling of the roller assembly 150.

In another variant, the outer ring 174 of each roller 162 has an outer surface 184 in the form of a diabolo so as to reduce the amplitude of the micro-bosses of the compacting generatrix. In another variant, the installation 11 has no pre-compacting station 102 and/or post-compacting station 106.

This is for example the case when the matrix 40 is made from a thermosetting polymer or a ceramic material. This is the case where the matrix 40 is made from a thermosetting polymer, the cross-linking heating is also done just after the compacting of the strips 44.

In another variant, the cylindrical outer surface 112 on which the strips are wound 44 is not located on a tubular liner of the pipe 10 or on an already-formed reinforcing layer, but rather on a mandrel, which in particular makes it possible to produce a pipe 10 with no inner tubular liner 20. The present invention can in particular be implemented in combination with the mandrel production method described in WO2008/029252.

In another variant intended in particular to produce TCP flexible pipes, the installation 11 does not comprise the station 108 for winding armor plies and/or the station for forming the outer liner 110, and the pipe 10 has no armor plies 24, 25 and/or outer liner 30.

In another variant, the support element 132 is fixed in rotation about the axis A-A', the cylindrical surface 112 being rotated about the central axis A-A'.

The support element 132 and the cylindrical surface 112 are translatable relative to one another along the axis A-A', for example by translation of the support element 132 along the axis A-A'.

The device and the installation according to the present invention are not limited solely to the field of flexible pipes, and they more generally apply to the production of all tubular structures that are produced by the helical winding of strips made from a composite material. The present invention may for example be applied to produce a tubular reinforcing structure for a high-pressure tank.

The invention claimed is:
1. A tubular structure compacter, including:
  a support defining a circulation passage of a cylindrical surface adapted to receive the tubular structure, the circulation passage having a central axis adapted to be coaxial with the cylindrical surface, the support and the cylindrical surface being adapted to be mounted rotating relative to one another about the central axis;
  at least one compacting roller assembly, borne by the support, the roller assembly including:
  a straight central shaft, having a longitudinal axis;
  a plurality of compacting rollers, mounted parallel to one another about the central shaft, each compacting roller having a peripheral surface rotating around the central shaft about a roller axis;

the longitudinal axis of the central shaft being parallel to the central axis, each roller axis being inclined by a nonzero incline angle relative to the longitudinal axis of the central shaft.

2. The compacter according to claim 1, wherein the incline angle is less than 40°.

3. The compacter according to claim 1, wherein the rollers define at least one pseudo-linear compacting generatrix adapted to come into contact with the tubular structure.

4. The compacter according to claim 3, wherein the compacting generatrix includes a plurality of micro-bosses, an amplitude of the micro-bosses being less than 0.1 mm.

5. The compacter according to claim 1, wherein a width of each roller is less than 10 mm.

6. The compacter according to claim 1, wherein a diameter of each roller is greater than 50 mm.

7. The compacter according to claim 1, wherein the roller assembly includes two inclined axial endpieces, mounted fixed in rotation on the central shaft on either side of the rollers.

8. The compacter according to claim 1, wherein each roller is mounted transversely perpendicular to the roller axis, between a central idle position and a plurality of off-centered positions, the roller including a resilient biaser biasing the roller toward the idle position.

9. The compacter according to claim 1, wherein each roller comprises an inner ring, mounted fixed in rotation about the central shaft, an outer ring, mounted rotatably about the inner ring, and at least one rolling bearing inserted between the inner ring and the outer ring.

10. The compacter according to claim 9, wherein the inner ring includes a through hole receiving the central shaft, the through hole having an inclined axis relative to the roller axis.

11. The compacter according to claim 1, wherein the central shaft has a central heat transfer fluid circulation opening, the heat transfer fluid being adapted to cool the rollers.

12. A tubular structure producing installation, including:
a tubular structure forming station including at least one winder configured to wind parallel strips in a helix around a cylindrical surface according to a helix angle and at least one heater to heat the strips;
at least one compacter according to claim 1, arranged in the tubular structure forming station, upstream of the tubular structure forming station and/or downstream of the tubular structure forming station, the roller assembly being adapted to be applied on the cylindrical surface and/or on a tubular structure formed on the cylindrical surface.

13. The installation according to claim 12, wherein the difference between the incline angle of each roller and 90° minus the helix angle is less in absolute value than 5°.

14. The installation according to claim 12, wherein the compacter is arranged in the tubular structure forming station or downstream of the tubular structure forming station, the roller assembly being arranged to apply at least one roller on each strip of the tubular structure.

15. A tubular structure forming method, comprising:
winding parallel strips in a helix around a cylindrical surface according to a helix angle;
before, during or after the winding in a helix, heating the strips to soften the strips at least partially;
before, during or after the winding in a helix, compacting the cylindrical surface and/or the wound strips, respectively, via at least one compacter according to claim 1.

* * * * *